United States Patent [19]
D'Herbecourt et al.

[11] Patent Number: 5,972,514
[45] Date of Patent: *Oct. 26, 1999

[54] BASE PAINTS COMPRISED OF POLYAMIDE POWDERS FOR USE IN COATING PVC STRUCTURES

[75] Inventors: Bruno D'Herbecourt, Bernay; Thierry Moulin, Saint Foy les Lyons, both of France

[73] Assignee: Elf Atochem S.A., Paris la Defense, France

[ * ] Notice: This patent is subject to a terminal disclaimer.

[21] Appl. No.: 08/730,537

[22] Filed: Oct. 11, 1996

Related U.S. Application Data

[63] Continuation of application No. 08/190,748, Feb. 1, 1994, Pat. No. 5,626,958.

[30] Foreign Application Priority Data

Feb. 5, 1993 [FR] France .................................. 93 01316

[51] Int. Cl.⁶ ........................ C08L 75/04; B32B 27/08; B32B 27/30
[52] U.S. Cl. ................. 428/424.6; 427/386; 427/393.5; 428/413; 525/111; 525/123; 525/125; 525/131; 525/408; 525/409; 525/411; 525/415; 525/424

[58] Field of Search ...................... 525/111, 123, 525/125, 131, 424, 408, 409, 411, 415; 428/424.6, 413; 427/393.5, 386

[56] References Cited

U.S. PATENT DOCUMENTS 5,279,882 1/1994 Daude ..................................... 428/192

FOREIGN PATENT DOCUMENTS

| 0047508 | 9/1981 | European Pat. Off. . |
| 0192515 | 8/1986 | European Pat. Off. . |
| 0469961 | 2/1992 | European Pat. Off. . |
| 1469096 | 1/1967 | France . |
| 55-157661 | 12/1980 | Japan . |

Primary Examiner—Patricia A. Short

[57] ABSTRACT

The invention relates to a coating composition for PVC sections, based on a polymeric vehicle, a crosslinking agent, and a thermoplastic resin powder. The coating composition is particularly useful for coating PVC sections for windows, shutters, and doors. PVC joinery coated with the composition of the invention has exceptional impact strength and resistance to abrasion, friction, and inclement weather.

9 Claims, No Drawings

BASE PAINTS COMPRISED OF POLYAMIDE POWDERS FOR USE IN COATING PVC STRUCTURES

This is a continuation of application Ser. No. 08/190,748, filed Feb. 1, 1994.

FIELD OF THE INVENTION

The present invention relates to coating compositions suitable for painting PVC sections. The compositions are based on polymeric vehicles, crosslinking agents, and thermoplastic resin powders. The coating compositions of the present invention are particularly useful for coating PVC sections for windows, shutters, and doors. PVC joinery coated with the composition of the invention has exceptional impact strength, as well as excellent resistance to abrasion, friction, and inclement weather.

BACKGROUND OF THE INVENTION

Polyamide-based paints have a particularly wide range of uses including coatings on wood (furniture, office furniture), on aluminum (prelacquering industry, coatings for roller blinds), on plastic substrates (data processing, audio and video equipment), and as ground coverings (parking, sports grounds).

European Patent EP-0,047,508 relates to applications-of the prelacquering type. This patent describes a coating composition for coating metal objects, making use of the belt lacquering (coil coating) process. The coating composition is characterized in that it contains a vehicle containing a hydroxyl functional group, a blocked polyisocyanate, and a polyamide powder. The coating is subsequently crosslinked at temperatures of between 200 and 260° C., which temperatures are too high to be employed on a rigid PVC section whose distortion threshold lies between 60° C. and 80° C.

Japanese Application 54.64945 No. JP 55157661, published on Dec. 9, 1980, describes a paint that is based on polyamide 6 or 6.6 or 6.10, silicone oil, and a particular urethane prepolymer and is applicable to PVC slide tracks intended for the motor vehicle industry. This coating is employed so as to obtain highly specific characteristics related to the friction coefficient.

French Patent FR 1,469,096 claims a polyurethane/polyamide system intended for ground-covering. The intended objective of this coating is the anti-skid effect.

One of the disadvantages of the PVC window is its white color. Producing colored PVC joinery assumes solving complex technical problems related especially to impact behavior, uniformity of aesthetic qualities and durability, over a wide range of colors, under acceptable economic conditions.

Four techniques which make it possible to impart color to sections are known at present:
coloring in bulk
coextrusion
veneering
painting.

Coloring in bulk is difficult because of incompatibilities between some components of the polymers and the pigments, resulting in poor behavior of the material towards the ultraviolet rays. Also, bulk coloring gives rise to high storage costs, since it would be necessary to store and make an inventory of numerous articles in a number of colors.

Coextrusion consists in extruding together the white PVC of the structure and the colored polymethyl methacrylate (PMMA) on the outer parts of the section. While the technique is well-developed and reliable, a number of obstacles arise, essentially of an economic nature. Manufacturing and storage costs are very high.

Veneering is the technique most widely employed at present. It consists in heat-bonding a polymer film onto the sections as they leave the extruder. Colored sections of good quality are thus obtained which have been employed for a number of years without notable failures. However, this technique has two major disadvantages. The impact behavior of veneered PVC is frequently unacceptable in work-site conditions that are often difficult. A significant economic disadvantage is high storage costs. It is necessary to store and make an inventory of numerous articles in a number of colors. Furthermore, the color range is frequently restricted due to storage constraints.

SUMMARY OF THE INVENTION

A coating has been discovered, consisting of one or more layers of paint made up of a dispersion of thermoplastic resins that are colored or colorless in bulk in a pigmented or unpigmented liquid varnish comprising one or more vehicles and a crosslinking agent soluble in organic solvents. This paint is subsequently deposited on PVC joinery and then crosslinked in most cases at about 50° C. in an infrared oven.

The present invention relates to a coating in the form of a colored or transparent film, of smooth or structured appearance, to the process for its preparation, to its application to a PVC substrate, in particular to articles intended for PVC joinery and its accessories (window supports, roller blinds, roller blind housings, etc.). The invention also relates to sections and joinery made of PVC and its accessories thus coated. These sections and accessories may be obtained by extrusion or molding.

These polyamide-based paints make it possible to overcome a number of limitations related, in particular, to aesthetic aspects, to behavior towards ultraviolet waves, and to impact strength. The high flexibility in application makes it possible to eliminate the storage problems associated with bulk-colored, coextruded, and veneered PVC articles.

DETAILED DESCRIPTION OF THE INVENTION

The present invention provides a coating composition suitable for coating polyvinyl chloride (PVC) articles of manufacture that comprises:
a) a vehicle comprising polyacrylate, epoxy resin, polyether, polyester, polycaprolactone, or vinyl polymers or mixtures thereof, which polymers contain hydroxyl groups, carboxyl groups, or both said groups,
b) an isocyanate crosslinking agent,
c) a solvent for said vehicle and crosslinking agent, and
d) finely divided thermoplastic resin particles in suspension.
A critical feature of the present invention is that said vehicle is branched to the extent that the paint film which is obtained by crosslinking said composition forms a film that is adherent to said PVC article of manufacture allows the plasticizers used in making said PVC article of manufacture to exude through said paint film.

The coating layer(s) according to the invention comprises a solid thermoplastic resin in the form of powder which has a particle size of up to 200 $\mu$m and preferably between 0.5 and 60 $\mu$m. The thermoplastic resin may represent from 0.5 to 80% by weight and, preferably, from 0.5 to 40% by weight relative to the dry coating. The vehicle is preferably a polymer which is soluble in the solvent. The crosslinking agent is also preferably soluble in the solvent.

Once crosslinked, the vehicle must be resistant to inclement weather, long-lasting and also resistant to cleaning agents. It must also be adherent to PVC.

It is preferable that it should form a network with a mesh that is sufficiently large to allow the additives and plasticizers for PVC to exude.

The vehicle, which may or may not contain hydroxyl and/or carboxylic groups, may be for example of the polyacrylate, epoxy resin, polyether, polyester, polycaprolactone or vinyl type.

According to an advantageous form of the invention the vehicle is a mixture of two resins A1 and A2.

A1 is a resin containing hydroxyl and/or carboxylic groups, for example, of the polyacrylate, epoxy resin, polyether, polyester or polycaprolactone type.

A2 is a chlorinated vinyl resin containing hydroxyl and/or carboxylic groups.

The resins A1 and A2 preferably have a number-average molecular mass of 350 to 35,000 and a hydroxyl and/or carboxylic functionality, in per cent by weight, of 0.5 and 6 and, preferably, of 0.8 to 4.

The vehicle may constitute from 20 to 99.5% by weight of the dry coating.

According to a preferred form of the invention, the resin A1 is a hydroxylated polyester resin and the resin A2 is a hydroxylated vinyl acetochloride copolymer.

The slightly branched hydroxylated polyester resin contributes the main performance properties of the film; namely, weather resistance, chemical resistance, durability in time. The fact that it is slightly branched makes it possible, after a crosslinking with the hardener, to obtain a three-dimensional polymer network with relatively large mesh, which allows the plasticizer present in the PVC, which exudes out of the material with time, to pass through the coating film without debonding it. A polymer lattice of closer mesh would not allow the plasticizer to migrate through the paint film and a debonding of the coating would be obtained with time. Thus, whether a particular resin is "slightly branched" in accordance with the present invention can be readily determined by simple empirical tests. As those skilled in the art will recognize, whether the degree of branching characterizing a particluar resin makes it "slightly branched" in accordance with the present invention will be a function not only of the structure of the resin itself but also of the hardener with which it is formulated.

The hydroxylated vinyl acetochloride copolymer resin, which is relatively polar and chlorinated (like PVC) contributes the adhesiveness to the PVC substrate. The fact that it is hydroxylated enables it to be also crosslinked with the isocyanate hardener and not to reduce the resistance of the film to attack.

The crosslinking agent employed is preferably an aromatic, aliphatic, or cycloaliphatic isocyanate compound and, preferably, a diisocyanate and/or a triisocyanate. While a non-blocked polyisocyanate compound will generally be employed as crosslinking agent, blocked polyisocyanates, provided that whey can be de-blocked at temperatures compatible with the PVC, may also be used. By way of example of diisocyanate there may be mentioned 1,6-hexamethylene diisocyanate, 4,4'-diphenylmethane diisocyanate, and 3-isocyanatomethyl-3,5,5-trimethylcyoclohexyl isocyanate, which latter is particularly preferred.

In the case of a carboxylated acrylic polymer it is also possible to employ epoxide acrylates as the crosslinking agent.

The crosslinking agent is preferably added in a quantity such that the molar ratio of the reactive groups in the crosslinking agent to those in the polymers containing hydroxyl and/or carboxylic groups is in the range from 0.6 to 1.5, preferably from 0.7 to 1.3.

Thermoplastic resins are intended to mean thermoplastic polymers which have a softening point of between 100° C. and 230° C. and, preferably, the polyamides. As suitable polyamides there may be mentioned polymers consisting of one or more ω-aminomonocarboxylic acids containing 6 to 12 carbon atoms per molecule or the corresponding lactams, for example: polycaprolactam (PA-6), the polymer of ω-aminoundecanoic acid (PA-11) and polylauryllactam (PA-12) or the copolymers, for example, of caprolactam and of ω-aminoundecanoic acid (PA-6/11), of caprolactam and of lauryllactam (PA-6/12) and of caprolactam, ω-aminoundecanoic acid and lauryllactam (PA-6/11/12).

The appropriate polyamides are also the products of polycondensation of a diamine, for example: hexamethylenediamine, and of a dicarboxylic acid, for example: adipic acid, sebacic acid, dodecanedicarboxylic acid and terephthalic acid. Representative examples of these polyamides include poly(hexamethylene adipamide) (PA-6-6), poly (hexamethylene sebacamide) (PA-6.10) and poly (hexamethylene dodecanedicarboxamide) (PA-6.12). Mixtures of polyamides may be optionally employed, provided that their softening point is in the range of 100–230° C. It is preferred to employ PA-11, PA-12, PA-6/12 and/or PA-12.12, by themselves or mixed.

Thermoplastic resins are also intended to mean polyetheramides and, among these, polyetheresteramides, especially those described in Patents FR 2,273,021 and FR 2,401,947.

The finely divided thermoplastic resin powders may be obtained by grinding polymers or by direct polymerization with the desired particle size, as described especially in Patent EP 192,515. A preferred range of thermoplastic resin particle sizes suitable for use in the present invention is up to 200$\mu$m, more preferably from about 0.5 to 60$\mu$m, and most preferably is from about 20$\mu$m to about 60 $\mu$m.

According to the invention the softening point of the thermoplastic resins is in the range from 110° C. to 230° C., preferably from 120° C. to 210° C. The softening point is generally determined with the aid of a Koefler bench.

Organic solvents which have a boiling point of between 40° C. and 310° C. and, preferably, between 77° C. and 193° C. may be employed as solvents that solubilize the vehicle consisting of the hydroxylated and/or carboxylated polymer (s) and the crosslinking agent. These solvents must not embrittle the PVC.

Representative examples of the solvents include aromatic hydrocarbons of the xylene and toluene type aliphatic esters of the ethyl acetate, butyl acetate or ethylene glycol acetate—ethyl ethoxypropionate—type, ketones such as methyl ethyl ketone, methyl isobutyl ketone and diacetone alcohol, aliphatic alcohols such as butanol, isopropanol, methanol, ethanol and 2-methoxypropanol (marketed under the name of Dowanol PM by Dow Chemical), aliphatic hydrocarbons which have a boiling point of between 30 and 160° C. (marketed, for example, under the trademark Hydrosol Essence A, B, C, D, E, F, G or H by the companies Total or Shell Chimie). The solvent(s) constitutes (constitute) from 10 to 70% by weight of the total of the composition and, preferably, from 30 to 50% by weight.

The coating composition may optionally contain one or a number of usual adjuvants and additives, for example: dispersing agents, antisag agents which modify reological properties, antifoam agents, stabilizers against UV, flow agents, plasticizers, gloss modifiers and cure accelerators such as para-toluenesulphonic acid, heavy metal salts and amines.

Suitable pigments for pigmenting the paint and the thermoplastic resin belong to the usual types, that is to say acidic, neutral or basic pigments which may be organic or inorganic in nature. If desired, the pigments may be pretreated to modify their properties. As an example of suitable pigments there may be mentioned titanium dioxide, red iron oxide, molybdate orange, lead chromate, carbon black and phthalocyanin pigments. Pigments are here also intended to mean metallic pigments such as aluminum and stainless steel. The ratio of the pigment(s) to the total dry coating may reach 60%.

The coating composition contains essentially no product of the silicone oil type. The latter product makes the coating very slippery and does not allow touch-up repairs; the repair material does not adhere.

The different layers of the coating according to the invention may be applied using various techniques for liquid application, but preferably by spraying with a pneumatic gun using mixed air or without air (airless) or using an electrostatic process of the pneumatic gun, mini bowl, or high-speed disk type.

Before coating, the substrate may undergo one or more surface treatments in order to improve the adhesiveness of the coating. By way of example there may be mentioned degreasing of the surface of the substrate, treatments of an oxidizing type such as flaming, corona discharge, and plasma treatment.

After coating of the substrate with the aid of the coating according to the present invention, the coating is cured for 2 hours to 24 hours, in general, in an oven heated to a temperature of between 20° C. and 80° C. and, preferably, between 40° C. and 60° C. or for 5 min. to 30 min. under infrared stoving at a surface temperature of between 50° C. and 100° C.

The composite materials obtained with the aid of the coating according to the invention consist:
  of one (or more) coating(s) with a thickness which may be between 10 and 100 μm and, preferably, between 10 and 40 μm,
  of a substrate, preferably of PVC with a variable thickness, in section form.

The performance advantages obtained with PVC sections and joinery coated in accordance with the invention are:
  high weather resistance (resistance to UV, moisture, and the like),
  high impact strength even at low temperature (no flaking)
  high scratch resistance,
  resistance in the Erichsen model 435 test: higher than 15 N.

PVC sections painted according to the present invention can be flexed or subjected to other deformations, with the paintwork remaining unaltered.

In addition, the following properties have been observed:
  resistance to wear at the window seals (dubbing during opening and closing),
  retention of the tensile resilience of unpainted PVC. The present invention may even improve this tensile resilience after aging because the coating protects the PVC and prevents surface crazing.

Also, the paint according to the present invention enables the weldability of the PVC to be retained. The sections and the surrounding of the weld can be painted and the mechanical strength of the weld is as good as with unpainted PVC.

EXAMPLES

The following examples illustrate the invention with, however, limiting it. Unless stated otherwise, quantities shown are expressed by weight.

Example 1

A) Preparation of the Coating

A mill base is prepared by mixing a proportion of the constituents of the coating in dispersion in one or more solvents.

The operation is carried out in a ball mill.

Once the dispersion has been produced, the remainder of the coating is added and the constituents are mixed thoroughly and the constituents are mixed thoroughly and the coating viscosity is then adjusted.

B) Constituent of the Coating

| Grinding | Quantity by Weiaht (g) |
|---|---|
| Slightly branched hydroxylatead polyester resin | |
| hydroxyl content: | 4.3% |
| equivalent weight: | 395 |
| Relative density at 20° C.: | 1.17 |
| Viscosity at 23° C: | 220 mPa s |
| diluted to 50% by weight in butyl acetate. | |
| This solution is called Resin A | 21.00 |

| Resin of the hydroxylated vinyl acetochloride copolymer type | |
|---|---|
| Hydroxyl content: | 2.3% |
| Relative density: | 1.39 |
| Number-average molecular mass: | 27,000 |
| Glass transition temperature: | 79° C. |
| Inherent viscosity: | 0.83 |

In solution as a concentration of 20% by weight in the following solvents:

| hydroxylated vinyi acetochloride copolymer: | 20 | 26.70 |
|---|---|---|
| butyl acetate: | | 31 |
| methoxypropyl acetate: | | 16 |
| Methyl ethyl ketone: | | 33 |
| | | 100 |

This solution is called Resin B

Grinding additives:

| Wetting agent: | 0.15 |
|---|---|
| Thixotropy agent: | 0.30 |

Grinding pigments:

| Phthalocaynin blue | 0.55 |
|---|---|
| Rutile titanium dioxide | 0.80 |
| Carbon black | 0.40 |
| Chrome yellow | 10.30 |

Complement:

| Resin A: | 10.45 |
|---|---|
| Resin B: | 13.35 |
| Surface active agent: | 0.35 |

-continued

| Zinc salt at a concentration of 10% by weight in methyl acetate: | 1.70 |
| Dibutyl laurate at a concentration of 5% by weight in Xylene: | 0.40 |
| Polyamide 11 thermoplastic resin of particle size between 20 and 60 μm | 4.65 |

Viscosity adjustment:

| Xylene | 2.00 |
| Butyl acetate | 6.90 |
| | 100.00 |

15 parts by weight of a polyisocyanate hardener are added to 100 parts by weight of this composition at the time of use (characteristics of the polyisocyanate: aliphatic polyisocyanate of the "biuret" type based on hexamethylene diisocyanate (HMDI), solids content: 75%, NCO content: 16.4%, viscosity at 23° C.: 250 mPa.s).

C) Application

After degreasing of the PVC substrate with a mixture of suitable solvents, the coating layer(s) is (are) applied with a pneumatic gun and is (are) then crosslinked for 12 h at 50° C.; thus coated, the substrate is cooled in the open air.

A composite material is obtained, consisting:

of a PVC section, of a surface layer with a thickness of approximately 250 to 50 μm.

Test 1:

Taber abrasimetre (NFT 30015): CS17 mil wheel 1000 cycles

Load: 500 g; loss in weight 110 mg adhesiveness: NFT 30038—score 0

QUV (NFT 30036):

After 1600 h of QUV we have a degradation of 4–5 relative to the greyness scale.

The adhesiveness is good: score 0

Impact (NFP 24500):

cold (−10° C.)

no break under an impact of 1 kg falling from 1 m (that is under an energy of 2 joules at −10° C.).

Sand Blast Test

The sections can be painted, cut and assembled in order to obtain joinery. The paintwork is not altered by welding. It has been discovered that PVC joinery items thus coated are highly resistant to the abrasion caused by a sand blast and to abrasion of the draftproofing faults which may be present, for example, on the frame against which the moving part of a window or of a door comes to bear.

The sand blast test is the following:

for 15 seconds at a constant distance of 6 cm with glass beads (size: between 53 and 105 microns) under an air pressure of 80 psi and a flow rate of 40 to 60 CFM.

Normal polyurethane: after 6–8 seconds the paint separated off.

After 15 seconds all polyurethane has disappeared.

Polyurethane filled with polyamide:

some loss in gloss and a change in color are observed.

Test for resistance to rubbing of a draught proofing brush:

20,000 strokes of a sliding opening: the product begins to shine a little but remains intact after 10,000 strokes.

It has also been found that this coating of the PVC joinery stood up very well to impact as well as to detergents and glass-cleaning products.

This paint adapts to the expansions caused by heat and to the distortions of the joinery without any damage or creasing.

We claim:

1. A coating composition suitable for coating polyvinyl chloride articles of manufacture, said composition being curable on a substrate and said composition comprising:

a) a vehicle comprising polymers selected from the group consisting of polyether, polycaprolactone, vinyl chloride polymers and mixtures thereof, said polymers contain hydroxyl groups, carboxyl groups, or both said groups, b) an isocyanate crosslinking agent, c) a solvent for said vehicle and crosslinking agent, and d) finely divided thermoplastic resin particles ranging in size from 0.05 to 200 μm in suspension, wherein said vehicle is branched to the extent that a paint film which is obtained by crosslinking said composition to form a polymer lattice of large mesh that is adherent to said polyvinyl chloride article of manufacture allows the plasticizers used in making said polyvinyl chloride article of manufacture to exude through said mesh.

2. A coating composition suitable for coating polyvinyl chloride articles of manufacture, said composition being curable on a substrate and said composition comprising:

a) a vehicle comprising a mixture of two resins A1 and A2, wherein A1 is a resin containing hydroxyl and/or carboxylic groups and is selected from the group consisting of polyacrylate, epoxy resin, polyether, polyester, polycaproclactone and mixtures thereof, and A2 is a chlorinated vinyl resin containing hydroxyl and/or carboxylic groups, b) an isocyanate crosslinking agent.

c) a solvent for said vehicle and crosslinking agent, and d) finely divided thermoplastic resin particles ranging in size from 0.05 to 200 μm in suspension, wherein said vehicle is branched to the extent that a paint film which is obtained by crosslinking said composition to form a polymer lattice of large mesh that is adherent to said polyvinyl chloride article of manufacture allows the plasticizers used in making said polyvinyl chloride article of manufacture to exude through said mesh.

3. The composition according to claim 2, wherein the resin A1 is a hydroxylated polyester resin and the resin A2 is a hydroxylated vinyl acetochloride copolymer.

4. The coating composition of claim 2 wherein said finely divided thermoplastic resin particles range in size from about 20 μm to about 60 μm.

5. An article of manufacture comprising polyvinyl chloride sections or joinery and its accessories made of polyvinyl chloride, wherein said sections, joinery, and joinery accessories are coated with a composition according to claim 2.

6. A method of making an article of manufacture comprising coated polyvinyl chloride sections or joinery and its accessories made of polyvinyl chloride which comprises coating said sections, joinery, or joinery accessories with a composition according to claim 2.

7. The composition according to one of claims 1 to 3, wherein said crosslinking agent is a non-blocked polyisocyanate compound.

8. The composition according to one of claims 1 to 3, wherein said finely divided thermoplastic resin is a polyamide powder.

9. The composition according to one of claims 1 to 3, wherein said composition also contains pigments, dyes, and fillers.

* * * * *